United States Patent [19]
Gordon

[11] Patent Number: 4,713,837
[45] Date of Patent: Dec. 15, 1987

[54] COMMUNICATION NETWORK

[76] Inventor: Alastair Gordon, 61 Dalewood Road, Toronto, Ontario, Canada, M4P 2N4

[21] Appl. No.: 813,229

[22] Filed: Dec. 24, 1985

[51] Int. Cl.⁴ .......................................... H04M 11/00
[52] U.S. Cl. ..................................... 379/93; 379/102; 379/106; 379/107
[58] Field of Search ................ 179/2 A, 2 AM, 2 AS, 179/2 DP; 358/84; 455/2; 379/91, 92, 93, 96, 98, 102, 106, 107

[56] References Cited

U.S. PATENT DOCUMENTS

| | | | |
|---|---|---|---|
| 4,104,486 | 8/1978 | Martin et al. | 179/2 AM |
| 4,365,249 | 12/1982 | Tabata | 455/2 |
| 4,455,453 | 6/1984 | Parasekvakos et al. | 179/2 AM |
| 4,504,831 | 3/1985 | Jahr et al. | 179/2 AM X |
| 4,506,111 | 3/1985 | Takerouchi et al. | 179/2 A |
| 4,533,948 | 8/1985 | McNamara et al. | 358/86 X |
| 4,540,849 | 9/1985 | Oliver | 179/2 AM |
| 4,546,382 | 10/1985 | McKenna et al. | 358/84 |
| 4,584,602 | 4/1986 | Nakagawa | 358/84 |
| 4,636,950 | 1/1987 | Caswell et al. | 379/93 X |
| 4,654,868 | 3/1987 | Shelley | 379/106 |
| 4,654,869 | 3/1987 | Smith et al. | 379/93 X |
| 4,689,619 | 8/1987 | O'Brien, Jr. | 358/84 X |

FOREIGN PATENT DOCUMENTS

| | | | |
|---|---|---|---|
| 2404074 | 8/1975 | Fed. Rep. of Germany | 358/84 |
| 3045607 | 7/1982 | Fed. Rep. of Germany | 179/2 AM |

OTHER PUBLICATIONS

"Paging System Broadcasts Nationwide on FM Radio Channel", Electronics, vol. 52, no. 1, Jan. 4, 1979.
PCT, Gomersall, "Preprogrammed Over the Air Marketing Research System", Oct. 10, 1985.

*Primary Examiner*—Jin F. Ng
*Assistant Examiner*—M. E. Connors

[57] ABSTRACT

A communication network advantageously uses existing broadcast channels to instruct remote receivers and eventually use automatic dial-up capability for forming a telephone communication link with a central processing facility. The network is capable of providing many services from remote reading of meters to electronic mail and electronic billing. The network is preferably shared by a number of large users communicating with a host of subscribers.

1 Claim, 1 Drawing Figure

COMMUNICATION NETWORK

BACKGROUND OF THE INVENTION

The present application relates to communication networks, and particularly to communication networks which use existing physical channels of communication which cooperatively form a new system for transfer of information in at least one, and preferably two, directions without the construction of additional physical communication channels or major upgrades to existing physical communication channels. The structure disclosed in this application has application for the automatic reading of various meters provided in homes, businesses, and institutions, as well as in electronic mail, electronic TELEX TM -type applications and security systems, and other data communication applications, as but some examples.

Various systems have been proposed for establishing a communication network between individual subscribers and certain utilities, such as the water utility, the gas utility, or the electric utility, whereby the meter of the particular utility is read electronically and the reading forwarded to the utility electronically. To a large extent, many of these systems required a telephone communication link being initiated by the utility causing the telephone within the subscribers' dwelling to be activated. Some arrangements placed equipment before the telephone to recognize an incoming signal, however, these have not proven popular. The main problem with this system is that all phones are activated by the incoming call resulting in inconvenience to the subscriber.

It has also been proposed to utilize existing cable television systems as a two way communication channel; however, owing to the high cost of conversion from one-way to two-way, such systems have proven to date only to be speculative. It has also been recognized that it would be possible to again hard wire a further communication channel within a city or region which is in effect what has happened with the use of TELEX systems; however, the cost for doing this has been prohibitive in most cases.

According to the present invention, a new utility or central processor or intermediary is proposed which would function much as the existing utilities for supplying the telephone services. This service would be particularly useful for the electrical utilities, water utilities, gas utilities as prime examples, and could also be used for electronic mail used by corporations and individuals. Basically, a new communication utility can be established which uses existing communication channels without modification, thus avoiding the massive investment in additional equipment for existing communication systems or for new communication systems that has been proposed in prior art arrangements. In effect, according to the present application, this communication utility is possible and will work in a way very similar to a new wire based communication network without requiring the massive investment for such a new communication network.

According to the present invention, the communication system combines the communication capabilities of the telephone and broadcast media with the power of distributed micro-processor intelligence. This system requires a receiver installed on the premises of each subscriber which interfaces with various communication channels including the telephone communication channel and, in certain cases, a cable television outlet. The receiver is adapted to continually "hear" a broadcast signal either sent on the free air or over the cable TV network. In this way, the receiver is always "listening" for its identification signal and, upon matching its identification signal with a received signal, it initiates a telephone communication from the receiver to the central processing facility. In this way, the problems associated with a telephone call being placed to the subscriber from the processing facility are avoided.

SUMMARY OF THE INVENTION

A communication network according to the present invention, comprises a plurality of receiving means in combination with a central processing facility. The central processing facility is adapted to receive and automatically answer incoming telephone calls and to send out an instructing signal containing particular address and preferrably command signals mixed with, or superimposed on, a transmitted broadcast signal. Each of the receiving means has a particular address, and is tuned to the instructing signal. Each receiving means further includes means for determining whether the instructing signal contains the particular address of the receiving means. Processing means are associated with each receiving means and activated by the receiving means upon receipt of the appropriately addressed instructing signal to execute a control action based on command data contained in the instructing signal, for example, to determine the value of at least one predetermined function of a plurality of functions. This value or values is transmitted to the central processing facility by automatically placing a call to the central processing facility and transmitting a code identifying the subscriber and the value of the at least one predetermined function. The central processing facility upon receipt of the transmitted coded signal processes the signal to, in general, combine it with other signals as required for subsequent transmission to predetermined parties.

Although the present invention makes it possible to effectively provide remote reading of various meters in a home, business, or institution, it is also possible to use this system for the relaying of information between individual subscriber equipment over existing telephone lines by means of a process intermediary. In this arrangement, the communication system includes subscriber equipment activation means other than existing telephone lines, with each subscriber equipment continuously listening for a predetermined instructing signal. The process intermediary includes means for storing information received by the process intermediary means for eventual transmission to one or more subscribers identified within the information. The process intermediary means includes means for processing the received signal to cause an instructing signal to be produced and transmitted to the identified subscriber over a non-telephone communication link and further includes means for transmitting the stored information over telephone lines when appropriately activated by the identified subscriber equipment. Each subscriber equipment includes means for establishing a telephone communication link with the process intermediary and includes means for identifying the subscriber to activate the process intermediary means after the communication link has been established and the subscriber identified. The subscriber equipment also includes storage means for receiving and recording the information addressed to the particular subscriber equipment.

A process for a communication system having a host of individual subscriber stations, each having an addressed receiver and processor for identifying a non-telephone signal uniquely addressing the particular station, and means associated with the receiver for initiating a telephone communication link with a signal processing intermediary upon receiving and identifying the address associated with the receiver is taught. The process requires the signal process intermediary to communicate with an existing broadcast system which produces, according to its normal operation, a broadcast signal capable of being received by each subscriber station. The process intermediary transmits instructing signals through a communication link for simultaneous transmission with the broadcast signal and includes telephone answering means for completing the telephone communication link with the subscriber station. The process intermediary includes means for storing and processing information received from a subscriber station identifying at least one unique receiver which is one of said subscriber stations, and causing said means for transmitting to transmit the identifying signal and preferably a command signal of the at least one receiver for simultaneous transmission with the broadcast signal. The means for processing causes transmission of such information to the identified subscriber station and facilitates the receipt of such information from the identified subscriber station upon establishment of the telephone communication link between the station and the signal process intermediary initiated by the subscriber station.

The central processing intermediary according to the present invention comprises means for automatically answering incoming telephone communication links from individual subscribers and establishing whether a signal is to be received from such subscriber for eventual transmission to others, or whether a previously received signal is to be transmitted to such subscriber. Means for recording received signals transmitted to the central processor from the subscriber stations over such telephone communication links is present, as well as means for processing each of the received signals to extract the identification code of a further subscriber to which at least a portion of the signal is to be sent. This extracted identification code is transmitted to a broadcast station for simultaneous transmission with a broadcast signal by means for transmitting a signal which forms part of the central processor. The central processor upon receipt of incoming telephone communication links at least partially determines whether the subscriber is to originate a signal for transmission to others or is to receive a signal transmitted to the central processor by another subscriber. Once this has been determined, the central processor selects the appropriate channel for processing of the signal.

A subscriber station for use in the communication network comprises means for establishing a telephone communication link with a central processor in preparation for the receipt of a signal from or the transmission of a signal to the central processor, tuning means for receiving a signal superimposed on a broadcast signal, means for comparing the received signal with a predetermined code peculiar to the subscriber station, control means for actuating the means for establishing a telephone communication link when a match between the received signal and the predetermined code is found, means for identifying the subscriber station to the central processor when the communication link has been completed, means for receiving and recording a signal originating from the central processor if the control means establishes the communication link, and means for selectively transmitting a signal to the central processor over a telephone communication link for, in general, eventual transmission to another party or subscriber.

BRIEF DESCRIPTION OF THE DRAWINGS

Preferred embodiments of the invention are found in the drawings wherein.

DETAILED DESCRIPTION OF THE PREFERRED EMBODIMENTS

Figure 1:
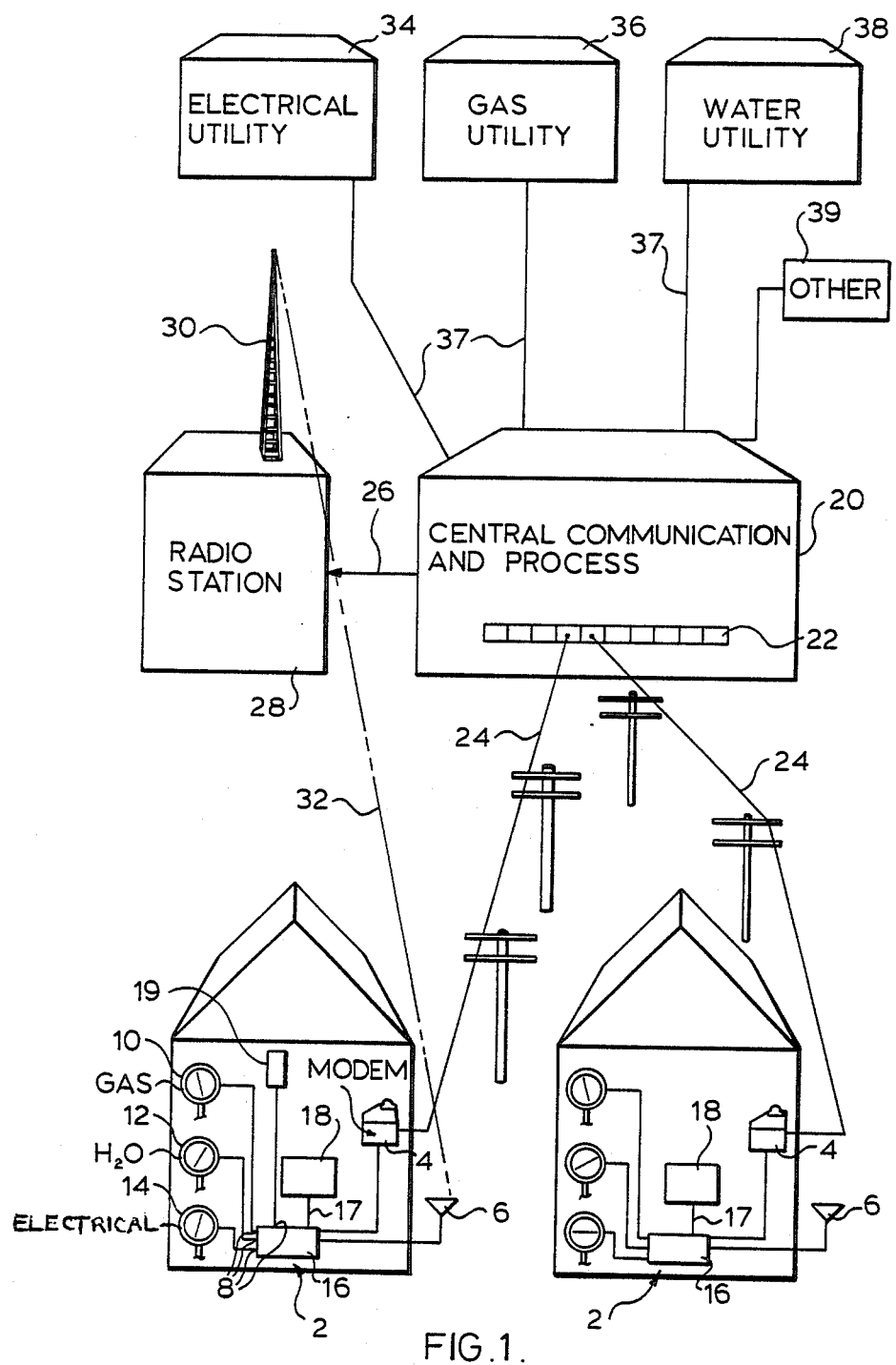
FIG. 1 is an overview of how the communication system connects various subscribers and each subscriber with one of several large utilities.

The schematic of the communication network is shown in FIG. 1 and includes a plurality of subscriber stations generally shown as 2, which are linked to a central processing intermediary generally shown as 20 via telephone modems 4 and the non-dedicated telephone lines 24. Each subscriber station 2 includes an input means, in this case the antenna 6, for receiving the free air communication broadcast generally shown as 32. It can be appreciated that the antenna 6 could be replaced with a connection to a broadcast carried over a cable network as but one alternative. Each station includes a number of input/output channels generally designated as 8 for allowing connection to the remotely readable gas, water and electricity meters generally designated 10, 12 and 14 respectively. In addition, a hot water heater 19 or other interruptible load is connected to the receiver/processor 16 in a manner to allow interruption of the power supply to the hot water heater or other load to effect load shedding as will be discussed subsequently.

Central processing intermediary 20 is a central computer with the capability of automatically answering various telephone signals conducted over the normal non-dedicated telephone lines. The automatic answer lines are generally designated as 22. The central processing intermediary 20 is also connected to a radio station 28 via the transmission line 26 to effect transmission of an instructing signal to the radio station 28. The instructing signal at least identifies the address code of desired subscriber stations, with this instructing signal being superimposed on the normal broadcast signal eventually received by the antennas 6. The receiver processor 16, of each subscriber station 2, continously listens or hears the instructing signal, and when a match between the particular address of the receiver/processor 16 and the instructing signal is achieved, certain functions will be carried out by the receiver/processor. Preferably command codes are also transmitted with the address codes such that the receiver/processor 16 carries out certain functions generally in preparation for communicating with the central process intermediary 20. Therefore, in effect, the broadcast signal 32 which includes the address signals, is used as an outbound link to identify the particular subscriber stations that are to carry out a particular function such as meter reading. In this case, the instructing signal would actuate certain receiver/processors 16 which would then determine the various values of meters 10, 12 and 14. These values may already be stored in memory of the receiver/- processor 16 if the signals from the meters are continuously fed to the receiver/processor 16. The receiver/processor 16 via the telephone modem 4 and an automatic dial-up capability places an outgoing telephone call to the central process intermediary 20, whereafter identification of the subscriber station and the various readings will be transmitted. The central process intermediary 20 would record these values and, preferrably, process them with other data received from subscriber stations for appropriate distribution to the utilities such as electrical utility 34, gas utility 36 and water utility 38 which can be electronically connected to the central process intermediary via dedicated or non-dedicated communication lines 37 or may be connected in a conventional manner such as by mail. Obviously, the electronic communication is preferred, and will allow more rapid invoicing by the various utilities.

In addition, other institution type users 39 of the system are shown and include governments, banks, brokers, newspapers, advertisers, security agencies, ticket agencies, credit card companies, data base services, market survey firms etc., who desire electronic communication with subscribers. These users may have a dedicated or non-dedicated connection to the central process intermediary 20 and may or may not require two way communication. This group would also "subscribe" to the system but because of its particular purpose, has been separately identified. These other users 39, may require additional equipment 18 at each subscriber station for functions such as information display, printing, entering, editing, storage, and processing. This equipment may include a printer, display, keyboard, storage means, and computer system, among other devices.

It is also possible to use this communication system for other functions, such as load shedding which will be discussed with respect to interruptible loads such as the hot water heater 19. It is well known that the electrical utility must operate within fairly rigid maximum load requirements and pay substantial penalties for exceeding the maximum. In order to provide them with control or at least some control over the total demand for electrical power, certain interruptible appliances within individual premises can be automatically disconnected for a short period of time to thereby reduce the peak load. This is true of hot water heaters and central air conditioners, and water heater 19 has been connected with the receiver/processor 16 and upon an appropriate signal being transmitted to the receiver/processor 16, the power supply of the hot water tank can be temporarily interrupted as required.

Many advantages are possible by having a central process interemdiary which effectively connects individual subscribers with individual utilities and other institutional users. Centralized meter reading for example, becomes an economic reality. In addition, the basic equipment can be added to make possible electronic mail and electronic billing as additional services. The communication network uses existing technology to allow the completion of a telephone communication link between the subscriber station and the central processing intermediary to be activated by the subscriber station upon receipt of an instructing signal. Therefore, two existing communication channels, broadcast and dial-up telephone, have been advantageously combined and a central processing intermediary has been introduced to substantially reduce the capital cost associated with each station. Furthermore, secondary features such as load shedding and time of day billing can be accomplished providing further economic justification of the capital costs.

The receiver/processor 16 includes logic such that the outgoing call to the central processing intermediary 20 only occurs when the telephone line is available and aborts the call in the event that another phone connected to the line is used. In this way, the normal operation of the telephone within the subscriber's premises remains unchanged and the subscriber station 2 only uses the line when not in use by the occupants.

It can be appreciated that the various utilities can make requests of the central processing intermediary via the preferred direct communication lines 37, however, it is somewhat more effective if all meter readings are transferred from the subscriber station to the central processor intermediary at the same point in time. Therefore, in order to transfer the required information to separate utilities, the central processing facility processes the information received from each subscriber and separates the same into the appropriate groups for distribution to the separate utilities. In this way, the central processing intermediary processes the information into a suitable form for use by other parties.

FIG. 1 up to this point, has been discussed with respect to the communication system for use in gathering information available at the subscriber's premises and/or the possibility of load shedding with respect to some appliances. It is also possible with this system to implement such services as dynamic time of day billing for electrical power, time of day metering for electrical utilities, quality of service monitoring for electrical utilities, supply pressure monitoring for water and gas utilities, control of certain uses of water, on-line monitoring of fuel oil tank levels, on-line monitoring of gas leaks, inventory monitoring for industrial gas cylinders, inventory monitoring for vending machines and remote monitoring and control of distributed equipment. These services require the use of specialized sensors of one sort or another, which result in an electrically-readable signal. The receiver/processor can be appropriately programmed to process these signals and provide a telephone communication link between the receiver/processor and the process intermediary. It is also possible in the present system to provide on-line monitoring of security alarms, on-line monitoring of smoke and fire alarms, on-line monitoring of flood alarms, heat loss alarms, panic switch alarms, medical monitoring and extended power failure alarms using the proposed communication network and suitable sensors.

In order to provide electronic mail or messages, the receiver/processor of the subscriber would be provided with a terminal 18 for the presentation and entry of information and preferrably some processing means and memory capacity. In a more sophisticated embodiment, it may utilize a personal computer as the terminal equipment 18 connected to receiver/processor 16 via line 17. A message would be originated at one subscriber station which thereafter would make the telephone communication link with the central processing intermediary 20 and transfer the desired message with the address of the subscriber or user to whom the message is destined. The central processing intermediary 20 would then extract the address code of the subscriber or user to which the message is to be sent and have a signal produced and transmitted with the broadcast signal generally indicated as 32. As all receiver/processors 16 are continuously listening they would recognize their particular address code and, in this case, may recognize a further code indicating that a message was waiting for them at the central process intermediary. The user of that particular receiver/processor would have a message or indication appearing thereon produced by his own receiver/processor acknowledging a message had been received by the central process intermediary. In this manual-type operation, the person would then complete a telephone communication link and have the message transmitted to him. It is also possible to automatically have this message transfered once the signal was received by the station using its automatic dial-up capability for contacting the central process intermediary 20. Therefore, this arrangement again uses the existing dial-up telephone lines to effect a communication link between the subscriber and the central process intermediary while using the broadcast signal to alert the subscriber equipment of particular functions to be performed.

The system described above provides an interactive subscriber service, which in effect, acts as a medium suitable for electronic mail, electronic delivery of invoices, electronic bill paying, electronic direct mail advertising, personalized real time information services, personalized notification services, electronic message services, shop at home services, home banking services, consumer surveys, plebisites, electronic purchase and delivery of tickets, and home lottery selection and ticket delivery to mention only a few of the possibilities. This full interactive subscriber service is accomplished without the creation of a new physical communication channel, by using the existing communication channels in a unique manner.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A communication system for transmitting information originating from a receiving and transmitting station and destined for another receiving and transmitting station over telecommunication channels comprising:
   a plurality of receiving and transmitting stations, each having a unique address code, means for receiving a broadcast signal which can include address codes, means for determining whether the particular address code is contained within a received broadcast signal, an automatic telephone dialer, means for actuating said automatic dialer when the address code is determined to be contained in said received broadcast signal, and a telephone line associated with said telephone dialer,
   a central processing facility including means to receive and automatically answer incoming telephone communications and store information including address codes transmitted during such communications, means to create an instructing signal containing particular address codes and incorporate such address codes in a broadcast signal, and
   a broadcast station which transmits such address codes to receiving and transmitting stations,
   wherein information identifying the destined receiving and transmitting station is transmitted from an originating station to said central processing facility which incorporates the address code of the destined receiving and transmitting station in a broadcast signal which when received by said destined receiving and transmitting station determines the particular address code is included in the broadcast signal by said determining means and actuates said automatic telephone dialer completing a telephone communication with said central processing facility which upon identification of said particular receiving means transmits to said destined receiving and transmitting station the information.

* * * * *